(12) United States Patent
Labeirie et al.

(10) Patent No.: US 6,994,300 B2
(45) Date of Patent: Feb. 7, 2006

(54) DEVICE FOR FASTENING ELONGATE OBJECTS ONTO A FLAT SUPPORT

(75) Inventors: Jean-Luc Labeirie, Colomiers (FR); Mickaël Blin, Blagnac (FR); Jean-Paul Vandries, Labastide Saint Pierre (FR)

(73) Assignee: Airbus France, Toulouse (FR)

( * ) Notice: Subject to any disclaimer, the term of this patent is extended or adjusted under 35 U.S.C. 154(b) by 129 days.

(21) Appl. No.: 10/405,502

(22) Filed: Apr. 3, 2003

(65) Prior Publication Data

US 2003/0218111 A1 Nov. 27, 2003

(30) Foreign Application Priority Data

May 23, 2002 (FR) .................................. 02 06269

(51) Int. Cl.
*F16L 3/00* (2006.01)
(52) U.S. Cl. ........................ 248/70; 248/65; 248/73; 248/74.1; 248/74.3
(58) Field of Classification Search .............. 248/67.7, 248/68.1, 70, 71, 72, 73, 74.3, 74.4, 74.1, 248/74.2, 316.1, 316.6
See application file for complete search history.

(56) References Cited

U.S. PATENT DOCUMENTS

| | | | |
|---|---|---|---|
| 1,750,575 A * | 3/1930 | Cubberley | 211/11 |
| 1,750,576 A * | 3/1930 | Cubberley | 211/11 |
| 3,599,915 A * | 8/1971 | Soltysik | 248/68.1 |
| 3,604,676 A * | 9/1971 | Weber | 248/68.1 |
| 3,844,415 A * | 10/1974 | Heimann | 211/43 |
| 4,106,735 A * | 8/1978 | Partain et al. | 410/49 |
| 4,526,333 A * | 7/1985 | Nakama et al. | 248/73 |
| 5,024,402 A * | 6/1991 | Hamel | 248/52 |
| 5,183,163 A * | 2/1993 | Slaiken | 211/43 |
| 5,725,185 A * | 3/1998 | Auclair | 248/74.2 |
| 5,749,475 A * | 5/1998 | Krebs | 211/24 |
| 6,012,691 A | 1/2000 | van Leeuwen et al. | |
| 6,543,737 B2 * | 4/2003 | Decker et al. | 248/316.1 |

* cited by examiner

*Primary Examiner*—Steven Marsh
(74) *Attorney, Agent, or Firm*—Stevens, Davis, Miller & Mosher, LLP

(57) ABSTRACT

A fastening device may include, in some embodiments, two end parts, each of which has a bearing face for resting on a flat support and which can be assembled to each other by a sliding connection with marked positions. A cradle of the device, for accommodating an elongate object transversely to the flat support, has two half-cradles respectively carried by the two end parts. The two end parts have a structure for catching onto side edges of the flat support.

9 Claims, 5 Drawing Sheets

DEVICE FOR FASTENING ELONGATE OBJECTS ONTO A FLAT SUPPORT

FIELD OF THE INVENTION

The present invention relates to a device for fastening elongate objects, such as tubes, sheaths, cables, etc. onto a flat support, such as a flange of a profile, defined by two side edges which are at least approximately parallel, said device comprising a cradle in order to accommodate said elongate objects transversely to said side edges and fastening means, such as a strap, in order to fasten said elongate objects into said cradle.

BACKGROUND OF THE RELATED ART

It is known that, in aircraft, the various electrical cables provided on board are fastened to beams or to frames of the fuselage by means of fastening devices of the type mentioned above. In addition, it is known that, currently, civil transport aircraft are becoming increasingly large, such that their beams and their frames are increasingly wide. It is therefore no longer possible to use the fastening devices currently in use in previous civil transport aircraft for the large modern civil transport aircraft. This is because, on the one hand, these fastening devices are not suitable for being fastened to wide beams or frames and, on the other hand, the cradles currently used for these fastening devices are not wide enough to prevent said cables from rubbing against the wide beams or frames, which leads to electrical insulation faults from wear of the sheaths of these cables and therefore to interference in the operation of the electrical circuit connected to said cables.

SUMMARY OF THE INVENTION

The object of the present invention is to overcome these drawbacks.

To this end, according to the invention, the device for fastening elongate objects onto a flat support defined by two side edges which are at least approximately parallel, said device comprising two end parts which can be assembled to each other by means of a sliding connection with marked positions, each one of which comprises means for catching onto one of said side edges, is noteworthy in that:
  each of the two end parts has a bearing face, which is capable of resting on said flat support and which carries, on the side away from said catching means, a cradle portion; and
  the two cradle portions form a cradle in order to accommodate said elongate objects transversely to said side edges.

Thus, by virtue of the present invention, the fastening device can be adapted, in an adjustable manner, to broad flat supports. Furthermore, since said cradle consists of two half-cradles separated from each other and placed in the vicinity of said side edges of the flat supports, the risk of the cables being able to rub against these flat supports is virtually eliminated.

It will be noted that document U.S. Pat. No. 6,012,691 describes a device for fastening elongate objects comprising two end parts which can be assembled to each other by a sliding connection with marked positions, each of them comprising means for catching on one of the side edges of a flat support. However, the device of this prior document is designed for fastening elongate objects longitudinally (rather than transversely) onto the flat support and it cannot solve the problem of the invention. Furthermore, in this prior document, the two end parts are not able to form a face bearing against the flat support, since they are separated therefrom by a connection part.

In the fastening device of the invention, in order to completely eliminate the risk of the cables rubbing against the flat supports, it is further possible to implement the following particular features:
  said fastening device according to the present invention comprises an intermediate flat part, placed between said end parts, resting on said flat support and forming part of said sliding connection with marked positions; and/or
  at least one of said end parts has a flat extension lying above said flat support or above said intermediate part, in the direction of the other end part.

Furthermore, in order to provide good electrical insulation between said cables and said flat support, it is advantageous for the various parts of said fastening device to be made from an electrically insulating synthetic material.

Preferably, said sliding connection with marked positions is of the cooperating toothed bar(s) and elastic lug(s) type. In this case, it is advantageous for said electrically insulating synthetic material to be sufficiently elastic so that said elastic lugs can be made from this material.

Advantageously, the fastening device according to the present invention comprises means for positioning on said flat support. Such positioning means may comprise at least one lug carried by said device and capable of entering an orifice rigidly connected to said flat support, that is to say made directly therein or in an element rigidly connected to said flat support.

BRIEF DESCRIPTION OF THE DRAWINGS

The figures of the appended drawing will make it easier to understand how the invention can be made. In these figures, identical references denote similar elements.

DETAILED DESCRIPTION

Figure 1:
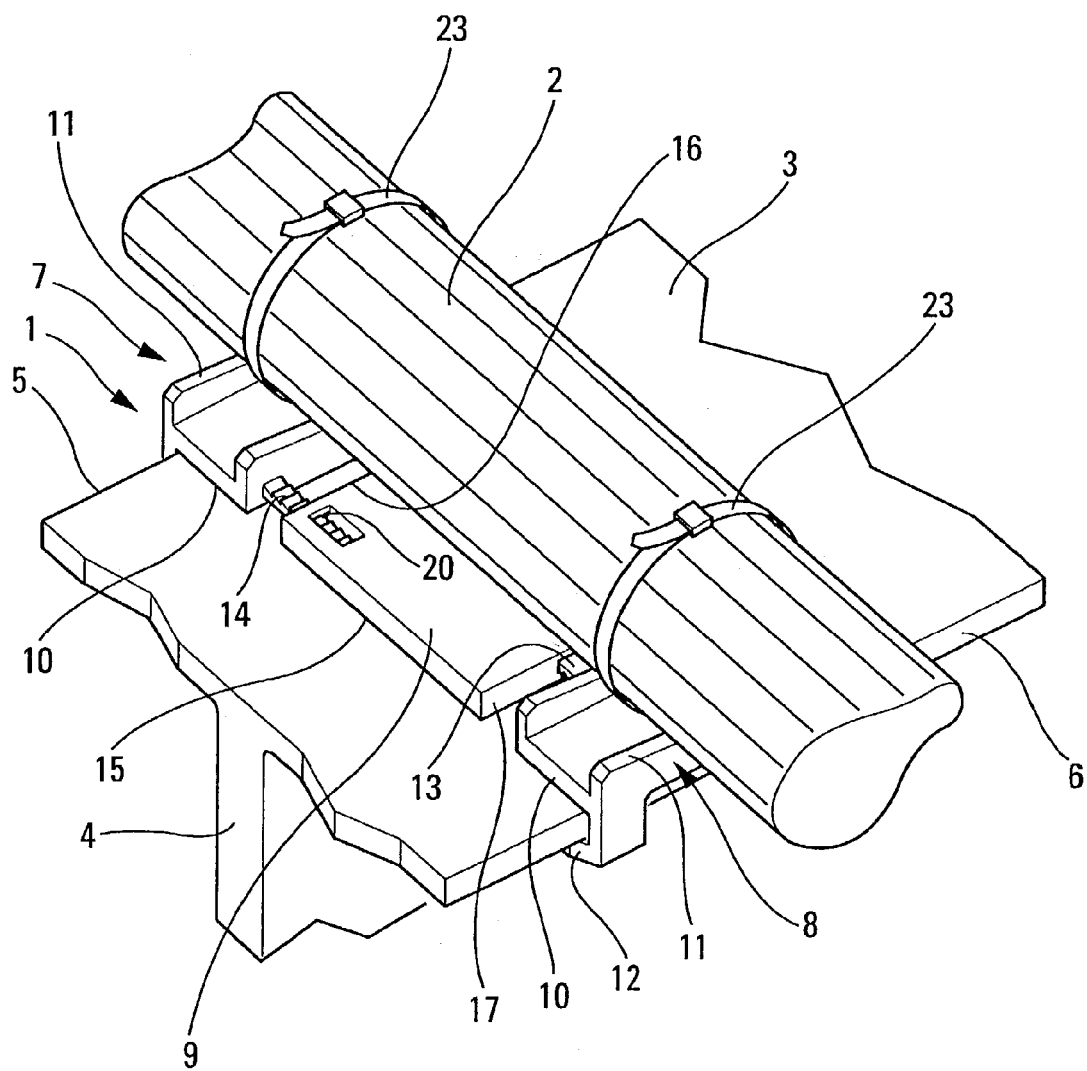
FIG. 1 is a perspective top view illustrating a first embodiment of the device according to the present invention, fastening elongate objects to a flat support.
Figure 2:
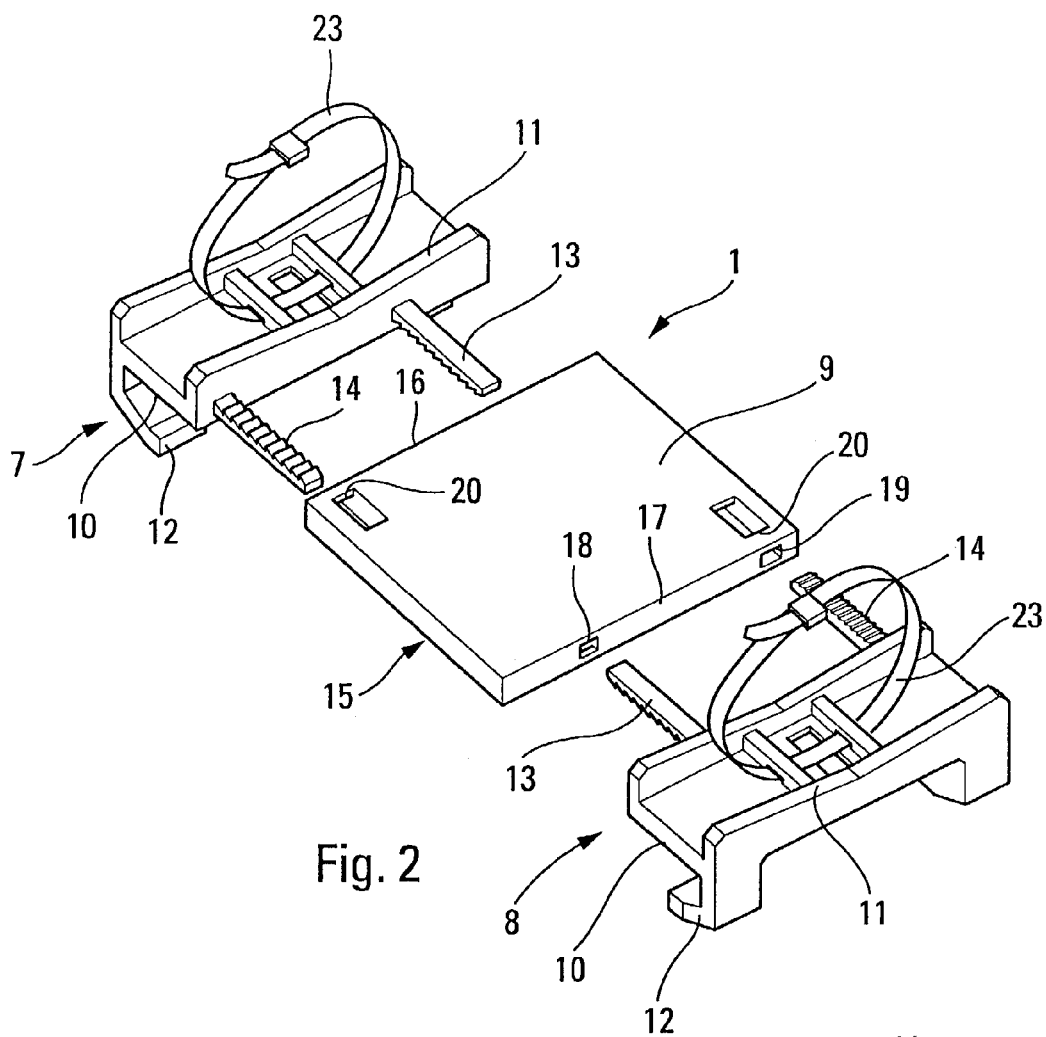
FIG. 2 is a perspective top view of the device of FIG. 1, in an exploded view.
Figure 3:
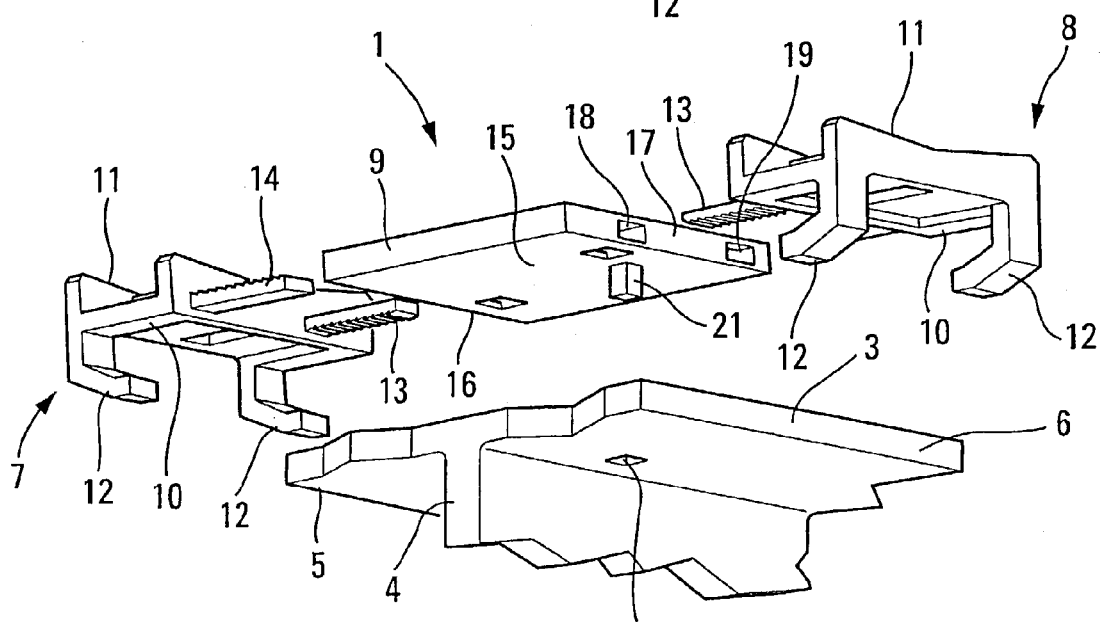
FIG. 3 is a perspective bottom view of the device of FIGS. 1 and 2, in an exploded view.
Figure 4:
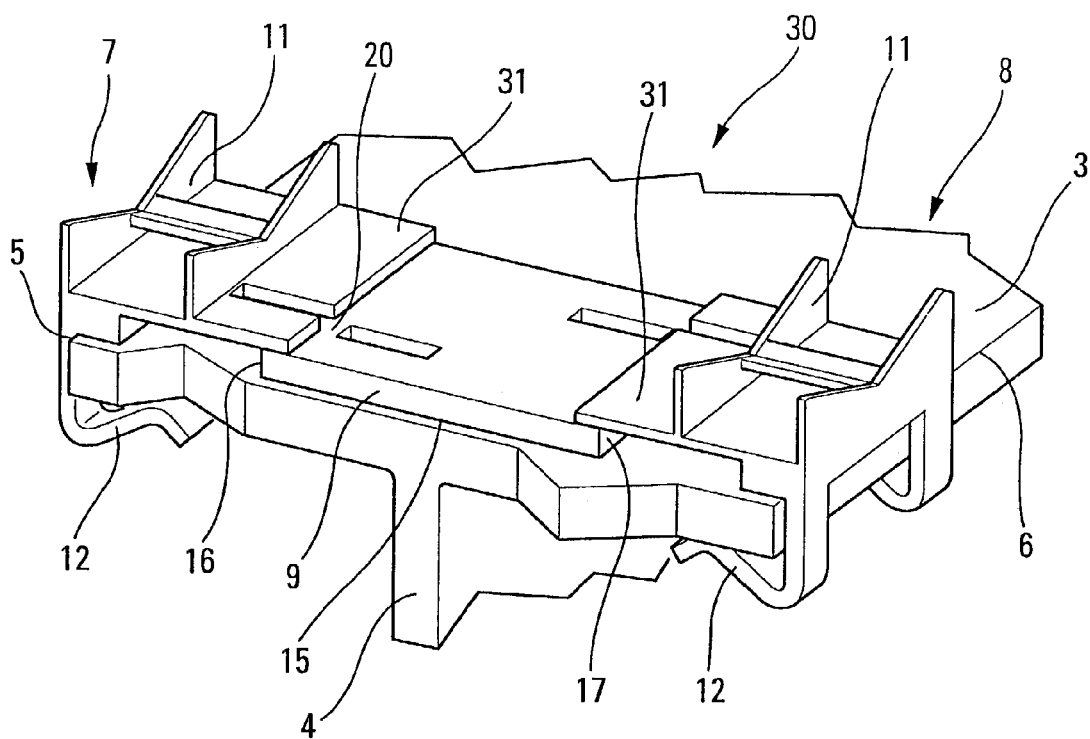
FIG. 4 is a partial perspective top view illustrating a second embodiment of the device according to the present invention, mounted on a wide flat support.
Figure 5:
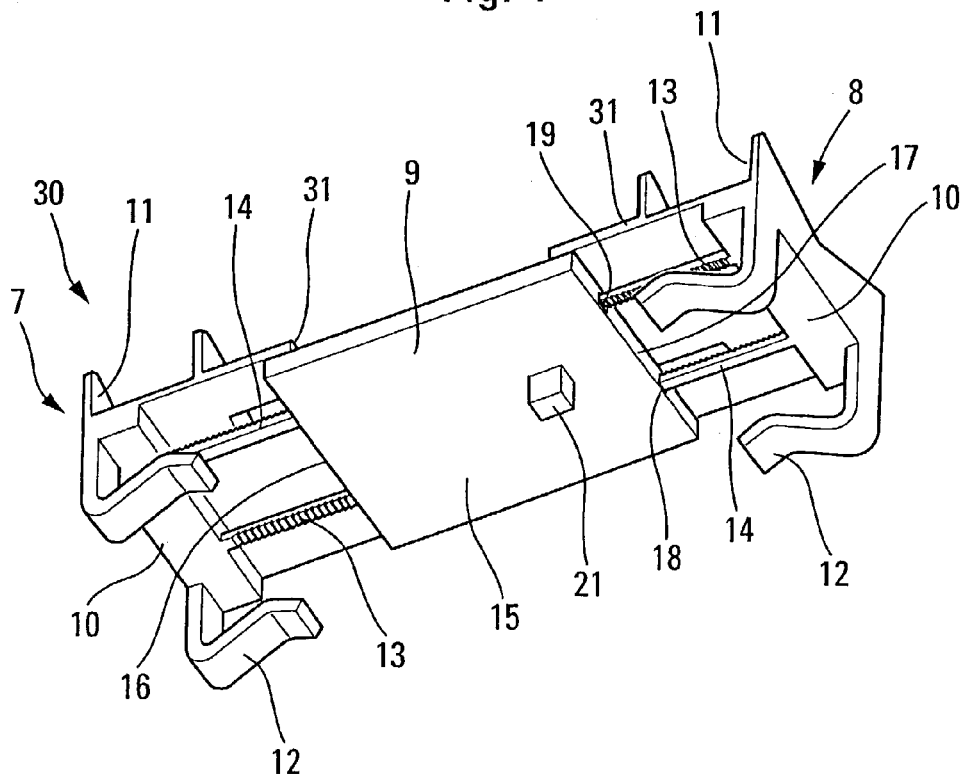
FIG. 5 is a partial perspective bottom view of the device of FIG. 4, the wide flat support being removed.
Figure 6:
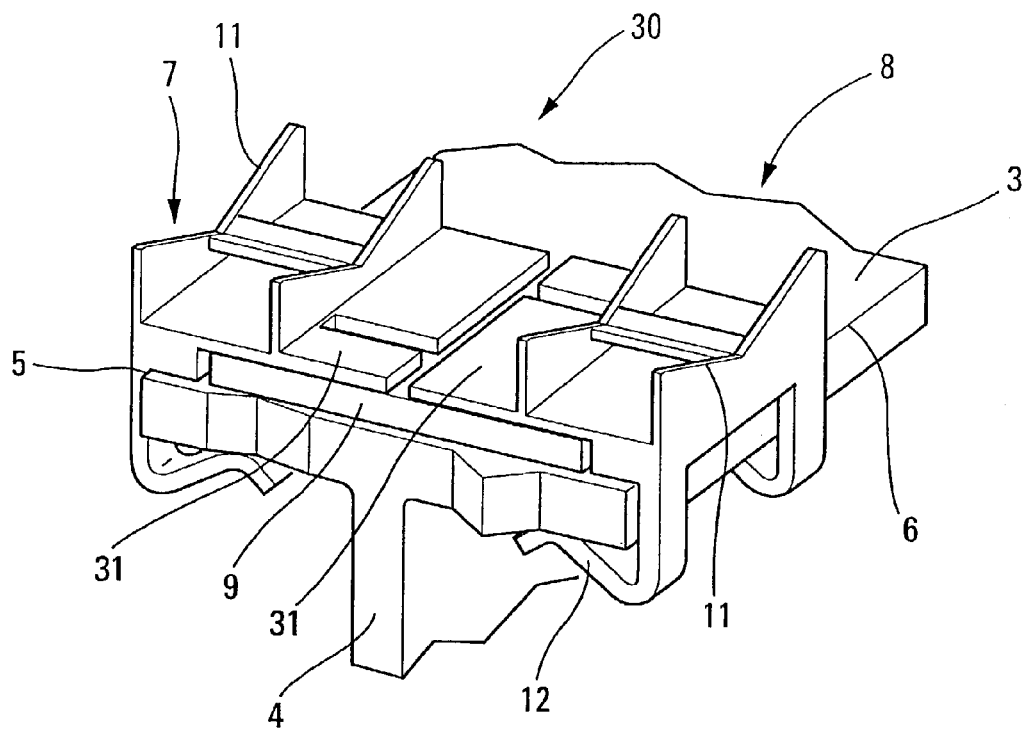
FIG. 6 is a partial perspective top view of the device of FIGS. 4 and 5, mounted on a narrow flat support.
Figure 7:
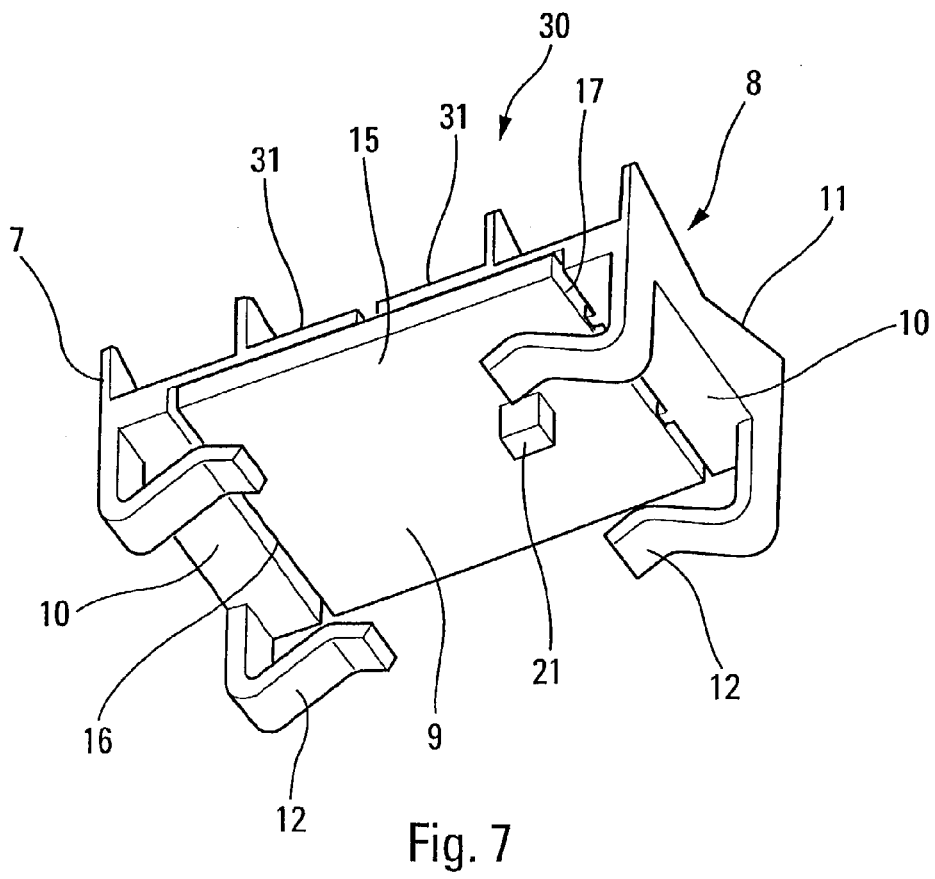
FIG. 7 is a partial perspective bottom view of the device of FIG. 6, the narrow flat support being removed.

The fastening device 1, according to the present invention and shown in FIGS. 1 to 3, is designed to fasten elongate objects 2 (tubes, sheaths, cables, etc.) onto a flat support 3. This flat support 3, which is, for example, a flange of a profile having a web 4, is defined by two side edges 5 and 6 which are at least approximately parallel.

The fastening device 1 comprises two identical end parts 7 and 8 and an intermediate part 9, for example made from a relatively elastic and electrically insulating synthetic material.

Each of said identical end parts 7, 8 comprises:
a bearing face 10 capable of resting on the flat support 3;
a cradle portion 11, placed above said bearing face 10 and capable of accommodating said elongate objects 2 transversely to said side edges 5, 6;
hooks 12, capable of catching behind one or other of the side edges 5, 6 and placed under said bearing face 10; and
projecting toothed bars 13, 14, placed above said bearing face 10 and on the side away from said hooks 12.

As for the intermediate part 9, which for example has the shape of a plate, it comprises a bearing face 15 capable of resting on said flat support 3 and opposite parallel edges 16 and 17 which are mutually symmetrical with respect to the center of said plate. Housings for the toothed bars 13, 14 of the end parts 7, 8 are provided in the thickness of the intermediate part 9, said housings (not visible) opening out into said edges 16, 17 through openings 18, 19. At the entrance to said housings, that is to say in the vicinity of the openings 18, 19, the intermediate part 9 has elastic lugs 20, formed therein, and capable of cooperating with the teeth of the toothed bars 13, 14 in order to mark the position thereof in said housings.

Furthermore, in its bearing face 15, the intermediate part 9 comprises a positioning finger 21, capable of entering a hole 22 made in the flat support 3.

Moreover, the fastening device 1 comprises straps 23 (not shown in FIG. 3), connected to the cradle portions 11 and capable of fastening the elongate objects 2 thereto.

In the description which has just been given, it will be easily understood that, since the intermediate part 9 is placed on the flat support 3 so that its bearing face 15 rests thereon and its centering finger 21 is in place in the hole 22, it is possible to assemble the two end parts 7, 8 to said intermediate part 9 by inserting their toothed bars 13 and 14 into the orifices 18 and 19, the bearing face 10 of said end parts 7, 8 resting on said flat support. By pressing said end parts 7, 8 in the direction of said intermediate part 9, the notches of the toothed bars 13, 14 push back the elastic lugs 20 until the hooks 12 press against the longitudinal edges 5 and 6.

The device 1 is then fastened to the flat support 3, the notches of said toothed bars 13, 14 preventing the end parts 7, 8 moving back in the direction opposite to the intermediate part 9.

After fastening the device 1 onto the flat support 3, the elongate objects 2 are secured to said device 1 by clamping using the straps 23.

Thus it is found that:
said end parts 7, 8 are assembled to each other by means of the sliding connection with marked positions consisting of the toothed bars 13, 14 and the intermediate part 9 and enabling the fastening device 1 to be adapted to the support 3;
the two cradle portions 11 of the end parts 7, 8 form, for the elongate elements 2, a cradle in two parts placed in the vicinity of the edges 5 and 6; and
the elongate objects 2 are protected from any contact with the flat support 3 by the insertion, between the latter and said elongate objects 2, of the end parts 7 and 8 and the intermediate part 9.

The embodiment 30 of the fastening device according to the invention shown in FIGS. 4 to 7 (in which the straps 23 are not shown) comprises the elements 3 to 21 described above. However, in this embodiment, the two identical end parts 7 and 8 are each provided with a flat extension 31 lying above the intermediate part 9, in the direction of the other end part. Thus the insulating properties of the device 30 are reinforced between the flat support 3 and the elongate objects 2.

Figure 8:
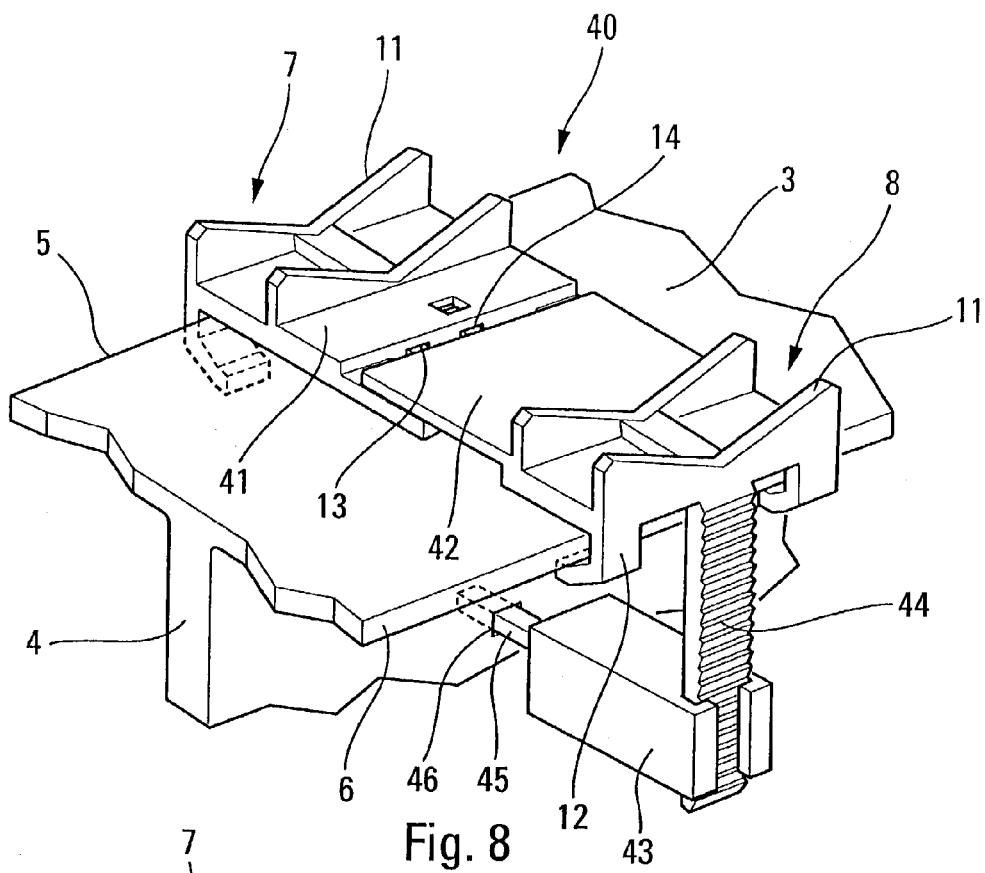
FIG. 8 is a partial perspective top view illustrating a third embodiment of the device according to the present invention, mounted on a flat support provided with an orthogonal web.
Figure 9:
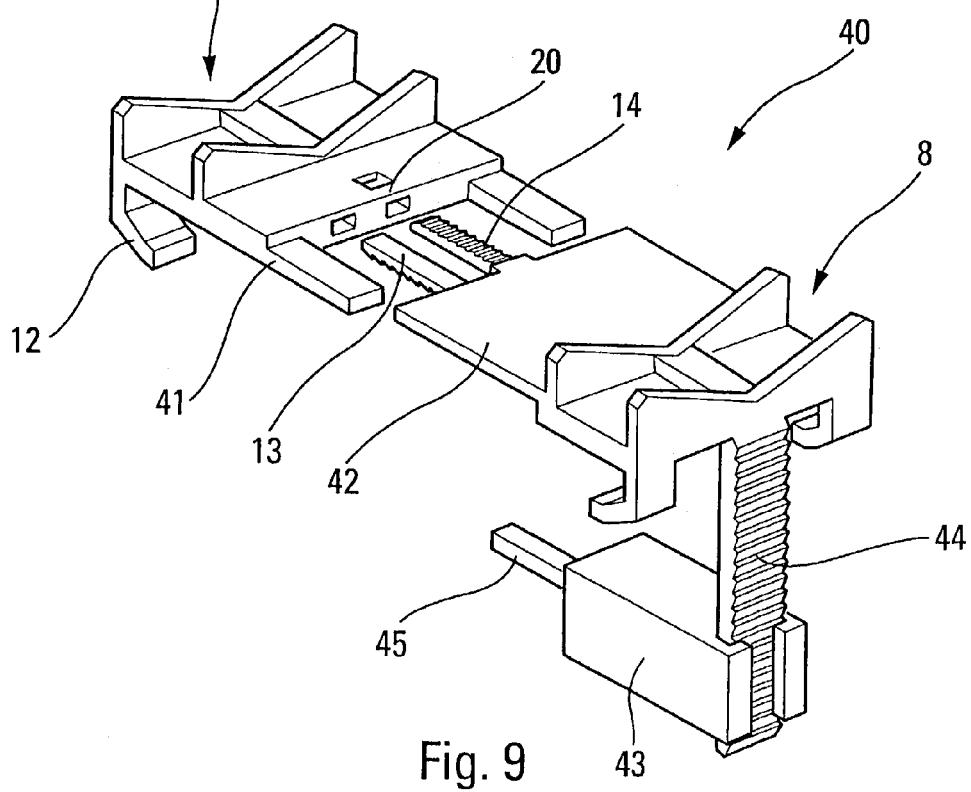
FIG. 9 is a partial perspective top view of the device of FIG. 8, in an exploded view, the flat support being removed.

In the embodiment 40 of the fastening device according to the present invention and shown in FIGS. 8 and 9, the intermediate part 9 has been removed and replaced by flat extensions 41 and 42, respectively secured to the end parts 7 and 8, which are then no longer identical. Each of the extensions 41 and 42 lies above the flat support 3, in the direction of the end part which carries the other extension. Furthermore, said extensions 41 and 42 are shaped so that they can overlap, in order to form a barrier between the flat support 3 and the elongate objects 2 (not shown). Furthermore, in the device 40, a slider 43 has been provided which can move, according to marked positions, along a toothed bar 44, secured to the end part 8 and orthogonal to the corresponding extension 42 (and therefore to the flat support 3). A positioning lug 45, capable of entering a hole 46 provided in the web 4 of the profile, is provided at the end of the slider 43.

The invention claimed is:

1. A device for fastening an elongate electrical object onto a flat support defined by two side edges that are at least approximately parallel, said device comprising:
two end parts made from an electrically insulating synthetic material, each of said end parts having:
means for catching onto one of said side edges, and
a bearing face for resting on said flat support and carrying, on the side away from said catching means, a cradle portion;
an intermediate flat insulation means; and
sliding connection means with marked positions for rigidly connecting said end parts together and to said flat support with said intermediate flat insulation means between said end parts such that the two cradle portions form a cradle to accommodate said elongate electrical object transversely to said side edges, wherein:
said intermediate flat insulation means insulates said elongate electrical object from said flat support, and
said sliding connection means cooperates with said intermediate flat insulation means and said two end parts to adjust the distance between said two end parts in a direction parallel to the length of the elongate electrical object when fastened to the device.

2. The fastening device of claim 1, wherein said intermediate flat insulation means is an individual piece placed between said end parts and forms part of said sliding connection means with marked positions.

3. The fastening device as claimed in claim 1, wherein said intermediate flat insulation means is formed by flat overlapping extensions of said end parts, each of said flat extensions lying above said flat support, in the direction of the other end part.

4. The fastening device as claimed in claim 2, wherein at least one of said end parts has a flat extension for lying above said intermediate flat insulation means, in the direction of the other end part.

5. The fastening device as claimed in claim 1, wherein the two end parts are identical to each other.

6. The fastening device as claimed in claim 1, wherein said sliding connection means with marked positions is of the cooperating toothed-bar and elastic lug type.

7. The fastening device as claimed in claim 6, wherein said elastic lug is made from the synthetic material of said end parts.

8. The fastening device as claimed in claim 1, which comprises means for positioning on said flat support.

9. The fastening device as claimed in claim 8, wherein said positioning means comprise at least one lug carried by said device for entering an orifice rigidly connected to said flat support.

* * * * *